US012592376B2

(12) United States Patent
Nagy et al.

(10) Patent No.: US 12,592,376 B2
(45) Date of Patent: Mar. 31, 2026

(54) ELECTROCHEMICALLY GROWN ZINC OXIDE LAYER ON CURRENT COLLECTORS FOR MITIGATING GROWTH OF LITHIUM DENDRITES

(71) Applicant: GM GLOBAL TECHNOLOGY OPERATIONS LLC, Detroit, MI (US)

(72) Inventors: Sayed Youssef Sayed Nagy, Troy, MI (US); Caleb Reese, Ferndale, MI (US); Yoojin Kim, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 502 days.

(21) Appl. No.: 18/125,824

(22) Filed: Mar. 24, 2023

(65) Prior Publication Data

US 2024/0322116 A1     Sep. 26, 2024

(51) Int. Cl.
*H01M 4/04*          (2006.01)
*C25D 3/42*          (2006.01)
*C25D 9/08*          (2006.01)

(52) U.S. Cl.
CPC .............. *H01M 4/045* (2013.01); *C25D 3/42* (2013.01); *C25D 9/08* (2013.01); *H01M 4/0435* (2013.01)

(58) Field of Classification Search
None
See application file for complete search history.

(56) References Cited

U.S. PATENT DOCUMENTS

| | | | | |
|---|---|---|---|---|
| 2020/0280105 A1* | 9/2020 | Adams | ................. | H01M 10/36 |
| 2023/0170493 A1* | 6/2023 | Jeon | ...................... | H01M 4/625 |
| | | | | 429/213 |
| 2023/0223546 A1* | 7/2023 | Amouzegar | ........ | H01M 4/1395 |

FOREIGN PATENT DOCUMENTS

| | | | | | |
|---|---|---|---|---|---|
| CN | 110828828 A | * | 2/2020 | ............ | H01M 4/663 |
| CN | 107910496 B | * | 8/2020 | ........ | H01M 10/0525 |
| CN | 113328101 A | * | 8/2021 | ............ | H01M 10/38 |
| WO | WO-2020093157 A1 | * | 5/2020 | .............. | C25D 7/00 |

* cited by examiner

*Primary Examiner* — Tracy M Dove

(57) ABSTRACT

A method for manufacturing a battery cell includes connecting a current collector to a working electrode; connecting a zinc metal portion to a counter electrode; immersing the current collector and a portion of the working electrode in a liquid; immersing the zinc metal portion and a portion of the counter electrode in the liquid; supplying molecular oxygen into the liquid; and electrochemically coating the current collector with a zinc oxide layer.

19 Claims, 4 Drawing Sheets

ELECTROCHEMICALLY GROWN ZINC OXIDE LAYER ON CURRENT COLLECTORS FOR MITIGATING GROWTH OF LITHIUM DENDRITES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to an electrodepositing a zinc oxide (ZnO) layer on anode current collectors for anode electrodes of battery cells.

Electric vehicles such as battery electric vehicles and hybrid vehicles are powered by a battery pack including one or more battery modules each having one or more battery cells. The battery cells include anode electrodes, cathode electrodes, and separators. The anode electrodes typically include anode active layers arranged on opposite sides of an anode current collector. The cathode electrodes typically include cathode active layers arranged on opposite sides of a cathode current collector.

Lithium metal is an attractive anode material for electrochemical energy storage. However, lithium dendrites grow on the anode electrode in three dimensions (3D) during use, which reduces efficiency. High Li nucleation overpotential contributes mainly to the formation of high surface area Li deposits. Additionally, galvanic corrosion of Li on the current collector occurs.

SUMMARY

A method for manufacturing a battery cell includes connecting a current collector to a working electrode; connecting a zinc metal portion to a counter electrode; immersing the current collector and a portion of the working electrode in a liquid; immersing the zinc metal portion and a portion of the counter electrode in the liquid; supplying molecular oxygen into the liquid; and electrochemically coating the current collector with a zinc oxide layer.

In other features, the method includes applying a voltage across the working electrode and the counter electrode. The method includes immersing a portion of a reference electrode in the liquid. The method includes applying current to the reference electrode. The method includes applying a negative voltage to the reference electrode.

In other features, the method includes creating an anode electrode by adding a lithium layer on the zinc oxide layer. The method includes adding the lithium layer includes electrodepositing the lithium layer. The method includes adding the lithium layer includes arranging a lithium layer on the zinc oxide layer using a roll-to-roll process.

In other features, the method includes providing a plurality of cathode electrodes; providing a plurality of separators; and arranging a plurality of the anode electrode, the plurality of cathode electrodes and the plurality of separators adjacent to one another in a predetermined order to form a battery cell.

A method for manufacturing a battery cell includes connecting a current collector to a working electrode; connecting a zinc metal portion to a counter electrode; immersing the current collector and a portion of the working electrode in a liquid; immersing the zinc metal portion and a portion of the counter electrode in the liquid; supplying molecular oxygen into the liquid; applying a voltage across the working electrode and the counter electrode; immersing a portion of a reference electrode in the liquid; and one of supplying current to the reference electrode and supplying a negative voltage to the reference electrode; and electrochemically coating the current collector with a zinc oxide layer.

In other features, the method includes creating an anode electrode by adding a lithium layer on the zinc oxide layer. The method includes adding the lithium layer includes electrodepositing the lithium layer. The method includes adding the lithium layer includes arranging a lithium layer on the zinc oxide layer using a roll-to-roll process.

In other features, the method includes providing a plurality of cathode electrodes; providing a plurality of separators; and arranging a plurality of the anode electrode, the plurality of cathode electrodes and the plurality of separators adjacent to one another in a predetermined order to form a battery cell.

A method for manufacturing a battery cell includes electrodepositing a zinc oxide layer on a plurality of current collectors; creating a plurality of anode electrodes by adding a plurality of lithium layers on the zinc oxide layer of the plurality of current collectors; providing a plurality of cathode electrodes; providing a plurality of separators; and arranging the plurality of cathode electrodes, the plurality of anode electrodes, and the plurality of separators in a predetermined order in an enclosure to form a battery cell.

In other features, the method includes adding the plurality of lithium layers includes electrodepositing the plurality of lithium layers.

In other features, adding the plurality of lithium layers includes arranging the plurality of lithium layers on the zinc oxide layer of the plurality of current collectors using a roll-to-roll process.

In other features, electrodepositing the zinc oxide layer on the plurality of current collectors includes connecting a current collector to a working electrode; connecting a zinc metal portion to a counter electrode; immersing the current collector and a portion of the working electrode in a liquid; immersing the zinc metal portion and a portion of the counter electrode in the liquid; supplying molecular oxygen into the liquid; and electrochemically coating the current collector with a zinc oxide layer.

In other features, the method includes applying a voltage across the working electrode and the counter electrode. The method includes immersing a portion of a reference electrode in the liquid; and one of applying current to the reference electrode and applying a negative voltage to the reference electrode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While current collectors including an electrochemically grown zinc oxide (ZnO) layer for battery cells are described in the context of electric vehicles, the current collectors can be used for battery cells in stationary or other applications.

While ZnO layers can be deposited onto current collectors using high vacuum deposition, the process is expensive and not practical for high-volume, low-cost production required for electric vehicles. The present disclosure relates a method for electrodepositing a ZnO layer on a current collector for a battery cell including electrodes that exchange lithium ions. The ZnO layer is electrochemically grown on the current collectors. The ZnO layer reduces lithium nucleation overpotential, which in turns leads to large Li particle deposits onto the current collectors. In addition, an electrochemically grown ZnO layer lowers galvanic corrosion of lithium on a surface of the current collectors.

A low-cost scalable electrochemical deposition (ECD) process for modifying the surface of the current collectors with the ZnO layer prevents delamination of lithium. The ZnO layer is lithiophilic and lowers a lithium nucleation overpotential, which increases the size of Li deposits. The ZnO layer minimizes Li dendrite growth. The ZnO layers lower the galvanic corrosion of lithium on the current collectors.

In some examples, ECD is performed using a 3-electrode cell (shown) or a 2-electrode cell purged with molecular oxygen gas. Solid zinc metal is used as the anode for $Zn^{2+}$ ions and the current collector acts as a cathode supplying electrons for the following reaction to proceed in the presence of molecular oxygen:

$$Zn^{2+}+\tfrac{1}{2}O_2+2e^-\rightarrow ZnO,$$

$E^0=0.93V/NHE$ (Normal Hydrogen Electrode)

Figures 1, 2A, 2B:
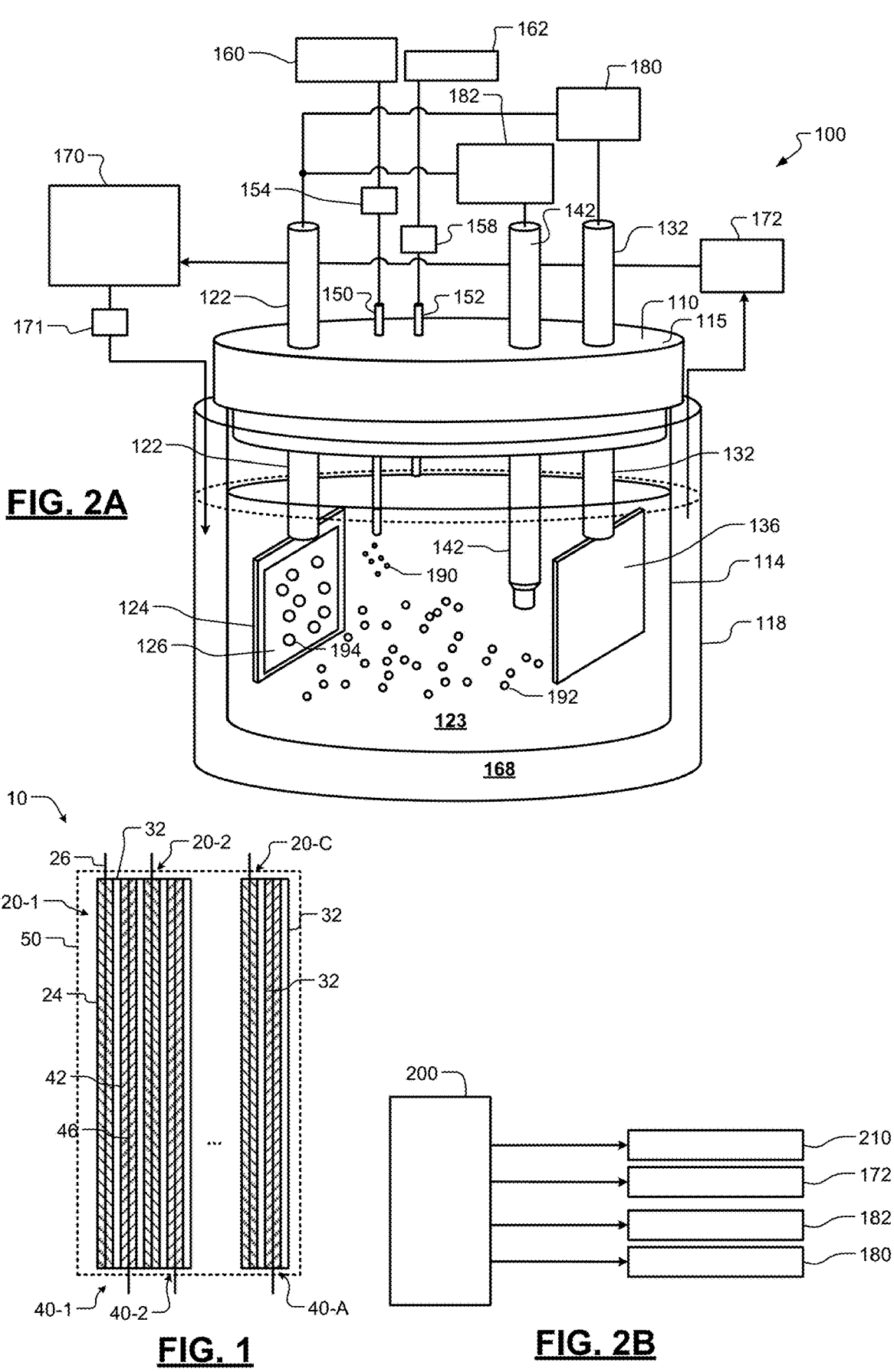
FIG. 1 is a side cross-sectional view of a battery cell including an anode electrode with a current collector having a zinc oxide layer according to the present disclosure.
FIG. 2A is a functional block diagram of an example of electrochemical deposition (ECD) for coating a current collector with a zinc oxide (ZnO) layer according to the present disclosure.
FIG. 2B is a functional block diagram of an example of a control system for ECD of FIG. 2A according to the present disclosure.

Referring now to FIG. 1, a battery cell 10 includes cathode electrodes 20-1, 20-2, . . . , and 20-C, where C is an integer greater than one. The cathode electrodes 20 include cathode active layers 24 and cathode current collectors 26.

The battery cell 10 includes anode electrodes 40-1, 40-2, . . . , and 40-A, where A is an integer greater than one. The anode electrodes 40 include anode active layers 46 and anode current collectors 46. The cathode electrodes 20, the anode electrodes 40 and the separators 32 are arranged in a predetermined order in an enclosure 50. For example, separators 32 are arranged between the cathode electrodes 20 and the anode electrodes 40.

Referring now to FIG. 2A, an electrochemical deposition (ECD) system 100 for plating a current collector with a ZnO layer is shown. An inner enclosure 110 includes an inner container 114 and a cover 115. An outer container 118 surrounds the inner enclosure 110.

A working electrode 122 extends through the cover 115 of the inner container 114 and is partially immersed in a first fluid 123 partially filling the inner container 114. In some examples, the first fluid 123 includes a mixture of 0.1 M potassium chloride and (5 mM) zinc chloride in water. A current collector 126 is attached to a lower portion 124 of the working electrode 122 and is immersed in the first fluid 123. In some examples, the current collector 126 comprises foil, expanded metal, or mesh. In some examples, the current collector 126 is made of copper.

A counter electrode 132 extends through the cover 115 of the inner container 114 and is partially immersed in the first fluid 123 in the inner container 114. A metal portion 136 comprising zinc metal is attached to the counter electrode 132 and is immersed in the first fluid 123 in the inner container 114. A reference electrode 142 extends through the cover 115 of the inner container 114 and is partially immersed in the first fluid 123 in the inner container 114. In some examples, the reference electrode 142 is made of silver/silver chloride (Ag/Ag/Cl), although other materials can be used.

A purge gas outlet 150 and a purge gas inlet 152 extend through the cover 115 of the inner container 114. The purge gas outlet 150 extends into the first fluid 123 in the inner container 114 to supply molecular oxygen into the first fluid 123. The purge gas inlet 152 extends above but not into the first fluid 123 in the inner container 114. The purge gas is supplied at the purge gas outlet 150 into the first fluid 123 and the purge gas is removed from the inner container 114 by the purge gas inlet 152. In some examples, valves 154 and/or 156 may be used to control gas supplied by the purge gas outlet 150 and the purge gas inlet 152 to and/or from the inner container 114. The purge gas outlet 150 is connected to a gas source 160 supplying molecular oxygen or another gas mixture including molecular oxygen. In some examples, the purge gas inlet 156 is connected to an exhaust system 162.

A heat transfer liquid 168 is supplied by a heat transfer liquid source 170 to the outer container 118. The heat transfer liquid source 170 cools the heat transfer liquid. A valve 171 and a pump 172 may be used to control flow of the heat transfer liquid 168 into the outer container 118.

A voltage source 180 supplies voltage across the working electrode 122 and the counter electrode 132. A current source 182 supplies a constant current to the reference electrode 142. Alternately, the current source 182 can be replaced by a voltage source (not shown) supplying a negative voltage around −1 volt to the reference electrode 142.

During operation, the voltage source 180 supplies voltage across the working electrode 122 and the counter electrode 132. The current source 182 supplies current to the reference electrode 142. Molecular oxygen 190 is supplied into the first fluid 123. The metal portion 136 supplies zinc ions (Zn2+) into the first fluid 123, ZnO is deposited onto the current collector 126 to coat the current collector 126.

Referring now to FIG. 2B, a control system for ECD of FIG. 2A is shown. In some examples, a controller 200 may be used to control ECD. The controller 200 controls valves 210, the pump 172, the current source 182 and the voltage source 180 during ECD.

Figure 3:
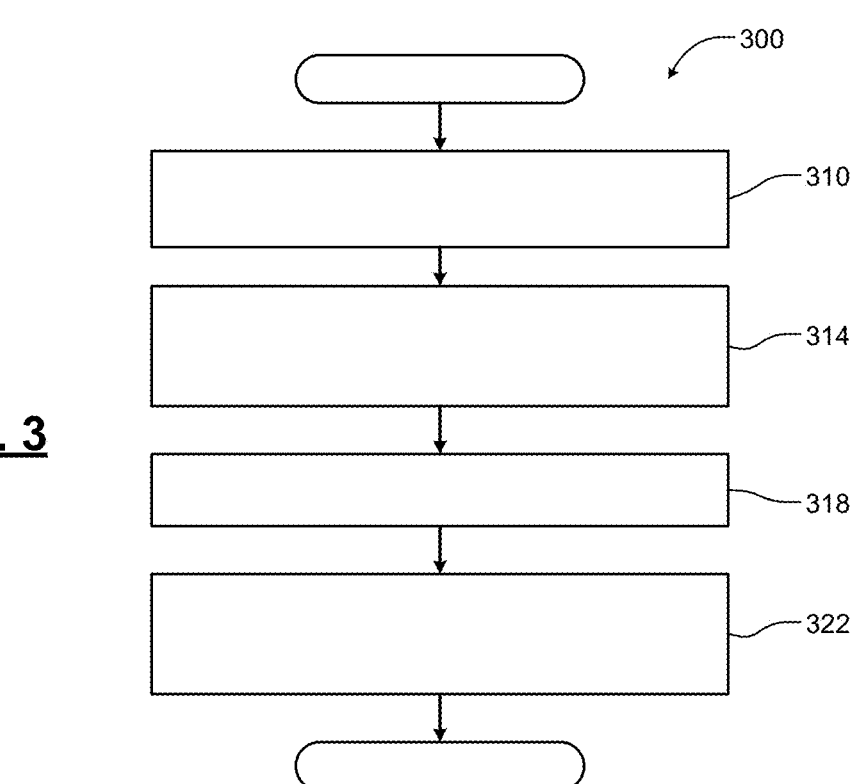
FIG. 3 is a flowchart of an example of a method for manufacturing a battery cell including the anode electrode with the current collector having the ZnO layer according to the present disclosure.

Referring now to FIG. 3, a method 300 for manufacturing a battery cell including a current collector with a ZnO layer is shown. At 310, the ZnO layer is electrochemically deposited onto the current collector. At 314, lithium is electrochemically deposited onto the ZnO layer of the current collector. Alternately, a lithium layer is rolled onto the ZnO layer of the current collector using a roll-to-roll process. At 318, cathode electrodes and/or separators are manufactured or otherwise provided. At 322, a plurality of the anode electrodes, the cathode electrodes, and the separators are arranged adjacent to one another in a predetermined order in an enclosure to form a battery cell.

Figure 4:
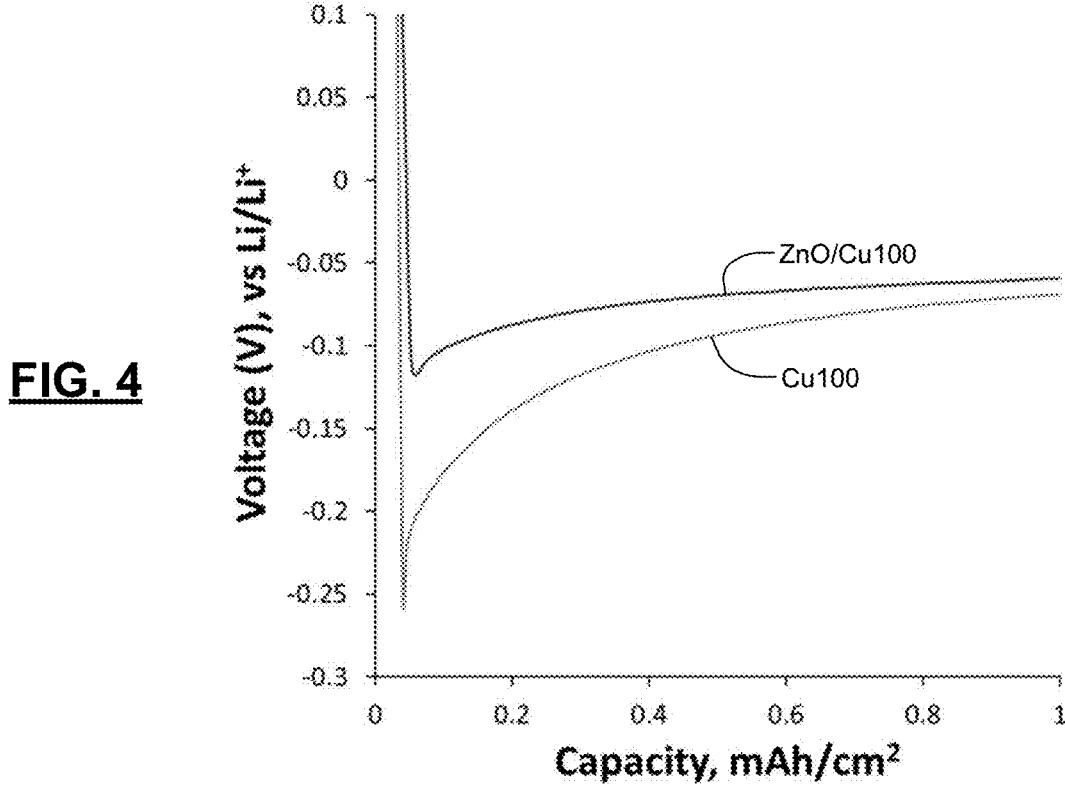
FIG. 4 is a graph showing voltage as a function of capacity to illustrate nucleation overpotential for a current collector with and without a ZnO layer according to the present disclosure.

Referring now to FIG. 4, a graph shows voltage as a function of capacity to illustrate lower nucleation overpotential for a current collector with a ZnO layer and without a ZnO layer. The current collector with the ZnO layer has a lower nucleation overpotential as compared to the current collector without the ZnO layer. In some examples, the current collector with the ZnO layer has a nucleation overpotential of 58 mV as compared to the current collector without the ZnO layer which has a nucleation overpotential of 186 mV. Lowering the nucleation overpotential significantly increases the size of the lithium deposits and reduces dendrite growth. Dendrite growth is typically caused by small particles of lithium. Therefore, increasing the size of the lithium particles reduces or minimizes lithium dendrite growth. In addition, the zinc oxide layer reduces galvanic corrosion on the current collector.

Figures 5A, 5B:
FIG. 5A is an enlarged view of an example of lithium dendrites forming on a current collector.
FIG. 5B is an enlarged view of an example of columnar lithium forming on a current collector with the ZnO layer according to the present disclosure.

Referring now to FIG. 5A, an enlarged view of an example of lithium dendrites forming on a current collector is shown. As described above, the higher nucleation overpotential of the current collector without the ZnO layer allows smaller lithium particles to collect on the current collector and lithium dendrites are formed.

Referring now to FIG. 5B, an enlarged view of an example of columnar lithium forming on a current collector with zinc oxide layer is shown. The larger lithium particles reduce dendrite formation.

Figure 6:
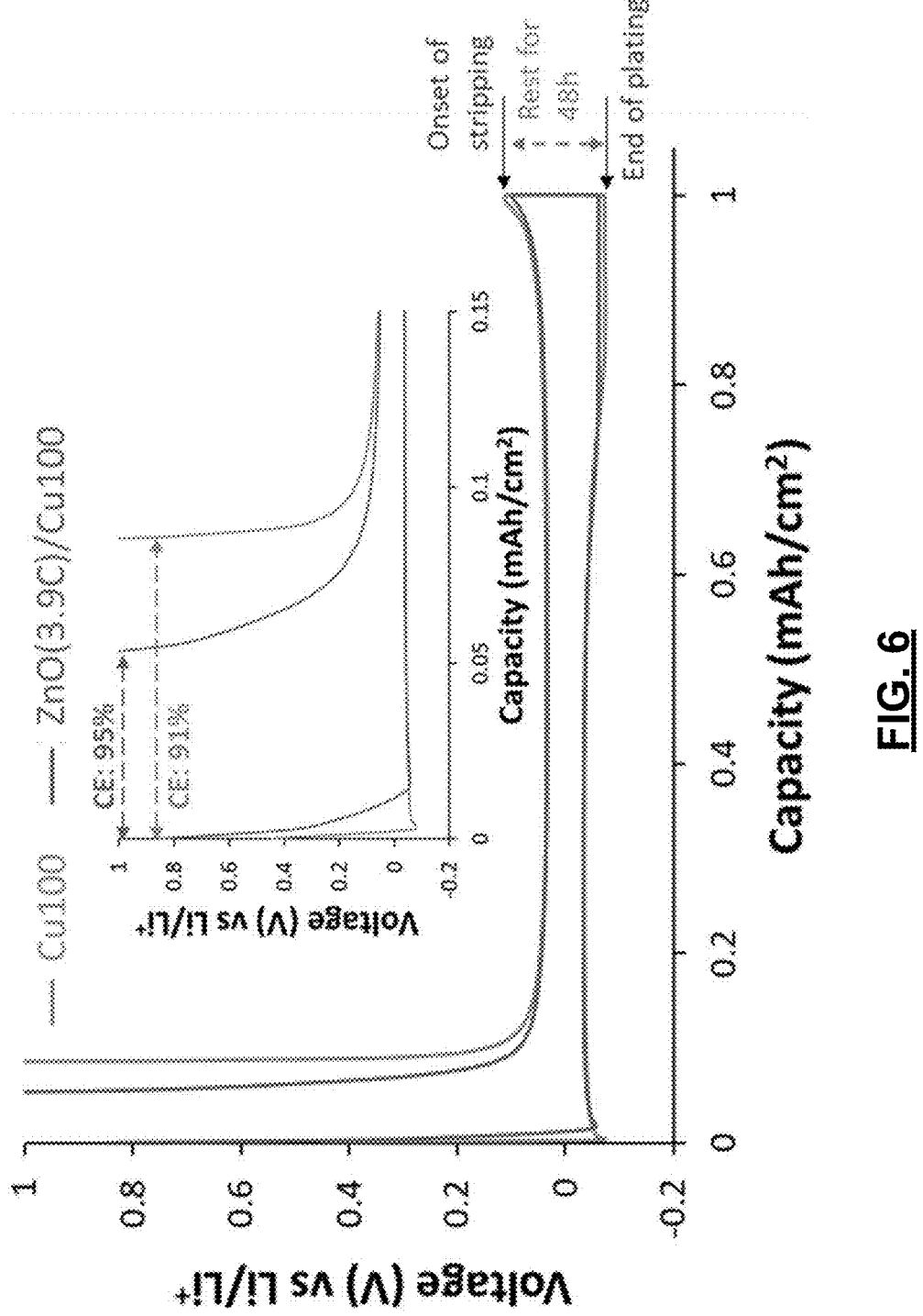
FIG. 6 is a graph showing voltage as a function of capacity to illustrate efficiency or reduced galvanic corrosion for a current collector with and without the ZnO layer according to the present disclosure.

Referring now to FIG. 6, a graph showing voltage as a function of capacity illustrates efficiency or reduced galvanic corrosion for a current collector with and without a ZnO layer. All cells were cycled at a current density of 1 $mA/cm^2$ with an electrodeposition capacity of 1 $mAh/cm^2$. The data corresponds to the second cycle. The battery cells were held at rest for 48 h after plating lithium at a capacity of 1 $mAh/cm^2$ and then stripping of lithium was performed. The current collector with the ZnO layer has a 95% efficiency in stripping the lithium as compared to 91% efficiency for the current collector without the ZnO layer.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for manufacturing a battery cell, comprising:
   connecting a current collector to a working electrode;
   connecting a zinc metal portion to a counter electrode;
   immersing the current collector and a portion of the working electrode in a liquid;
   immersing the zinc metal portion and a portion of the counter electrode in the liquid;
   supplying molecular oxygen into the liquid; and
   electrochemically coating the current collector with a zinc oxide layer.

2. The method of claim 1, further comprising applying a voltage across the working electrode and the counter electrode.

3. The method of claim 1, further comprising immersing a portion of a reference electrode in the liquid.

4. The method of claim 3, further comprising applying current to the reference electrode.

5. The method of claim 3, further comprising applying a negative voltage to the reference electrode.

6. The method of claim 1, further comprising creating an anode electrode by adding a lithium layer on the zinc oxide layer.

7. The method of claim 6, wherein adding the lithium layer includes electrodepositing the lithium layer.

8. The method of claim 6, wherein adding the lithium layer includes arranging the lithium layer on the zinc oxide layer using a roll-to-roll process.

9. The method of claim 6, further comprising:

providing a plurality of cathode electrodes;

providing a plurality of separators; and arranging a plurality of the anode electrode, the plurality of cathode electrodes and the plurality of separators adjacent to one another in a predetermined order to form the battery cell.

10. A method for manufacturing a battery cell, comprising:

connecting a current collector to a working electrode;

connecting a zinc metal portion to a counter electrode;

immersing the current collector and a portion of the working electrode in a liquid;

immersing the zinc metal portion and a portion of the counter electrode in the liquid;

supplying molecular oxygen into the liquid;

applying a voltage across the working electrode and the counter electrode;

immersing a portion of a reference electrode in the liquid;

one of supplying current to the reference electrode and supplying a negative voltage to the reference electrode; and electrochemically coating the current collector with a zinc oxide layer.

11. The method of claim 10, further comprising creating an anode electrode by adding a lithium layer on the zinc oxide layer.

12. The method of claim 11, wherein adding the lithium layer includes electrodepositing the lithium layer.

13. The method of claim 11, wherein adding the lithium layer includes arranging the lithium layer on the zinc oxide layer using a roll-to-roll process.

14. The method of claim 11, further comprising:

providing a plurality of cathode electrodes;

providing a plurality of separators; and arranging a plurality of the anode electrode, the plurality of cathode electrodes and the plurality of separators adjacent to one another in a predetermined order to form the battery cell.

15. A method for manufacturing a battery cell, comprising:

electrodepositing a zinc oxide layer on a plurality of current collectors;

creating a plurality of anode electrodes by adding a plurality of lithium layers on the zinc oxide layer of the plurality of current collectors;

providing a plurality of cathode electrodes;

providing a plurality of separators; and arranging the plurality of cathode electrodes, the plurality of anode electrodes, and the plurality of separators in a predetermined order in an enclosure to form the battery cell, wherein electrodepositing the zinc oxide layer on the plurality of current collectors includes:

connecting the plurality of current collectors to a working electrode;

connecting a zinc metal portion to a counter electrode;

immersing the plurality of current collectors and a portion of the working electrode in a liquid;

immersing the zinc metal portion and a portion of the counter electrode in the liquid;

supplying molecular oxygen into the liquid; and electrochemically coating the plurality of current collectors with the zinc oxide layer.

16. The method of claim 15, wherein adding the plurality of lithium layers includes electrodepositing the plurality of lithium layers.

17. The method of claim 15, wherein adding the plurality of lithium layers includes arranging the plurality of lithium layers on the zinc oxide layer of the plurality of current collectors using a roll-to-roll process.

18. The method of claim 15, further comprising applying a voltage across the working electrode and the counter electrode.

19. The method of claim 18, further comprising:

Immersing a portion of a reference electrode in the liquid; and one of:

applying current to the reference electrode; and applying a negative voltage to the reference electrode.

* * * * *